US006971207B2

(12) United States Patent
Schilt

(10) Patent No.: US 6,971,207 B2
(45) Date of Patent: Dec. 6, 2005

(54) EXPLOSION-RESISTANT WALL CONSTRUCTION

(76) Inventor: Andre Schilt, Majoraandonk 42, 3206 CA Spijkenisse (NL)

( * ) Notice: Subject to any disclaimer, the term of this patent is extended or adjusted under 35 U.S.C. 154(b) by 0 days.

(21) Appl. No.: 10/149,346

(22) PCT Filed: Dec. 8, 2000

(86) PCT No.: PCT/NL00/00910

§ 371 (c)(1),
(2), (4) Date: Jun. 9, 2003

(87) PCT Pub. No.: WO01/42578

PCT Pub. Date: Jun. 14, 2001

(65) Prior Publication Data

US 2004/0035076 A1    Feb. 26, 2004

(30) Foreign Application Priority Data

Dec. 8, 1999   (NL) .................................. 1013795

(51) Int. Cl.[7] ................................................ E04B 1/98
(52) U.S. Cl. .............................. 52/1; 52/272; 52/287.1; 109/79; 220/610; 220/639; 403/403
(58) Field of Search .............................. 52/573.1, 272, 52/287.1, 285.1, 277, 1; 109/79; 110/336, 110/237, 241, 242; 220/639, 610, 616; 403/341, 403/403

(56) References Cited

U.S. PATENT DOCUMENTS

| 1,066,018 | A | * | 7/1913 | Kehoe .......................... 220/616 |
| 3,360,207 | A | * | 12/1967 | Shelton, Jr. ............... 241/285.2 |
| 3,758,870 | A | * | 9/1973 | Schmitt et al. ............. 329/310 |
| 3,904,524 | A | * | 9/1975 | Pelton et al. .................. 210/94 |
| 4,632,041 | A | * | 12/1986 | Ohlson ........................ 109/1 S |
| 6,131,762 | A | * | 10/2000 | Metcalfe ..................... 220/651 |
| 6,187,451 | B1 | * | 2/2001 | Boos ........................... 428/598 |
| 2004/0104333 | A1 | * | 6/2004 | Ward et al. ................. 249/189 |

FOREIGN PATENT DOCUMENTS

WO    89/11007    * 11/1989    ............. E04B 1/92

* cited by examiner

Primary Examiner—Robert Canfield
(74) Attorney, Agent, or Firm—Varnum, Riddering

(57) ABSTRACT

A wall construction with increased resistance to overpressure, such as over-pressure as a consequence of explosions, comprises an essentially flat panel with a wall panel that is welded to adjoining structural components. The adjoining structural components are provided with at least one stop element having a supporting face facing the wall panel, which supporting face can be brought into interaction with the wall panel on deformation of the wall panel under the influence of an overpressure on that side thereof that faces away from the stop element.

14 Claims, 2 Drawing Sheets

EXPLOSION-RESISTANT WALL CONSTRUCTION

The invention relates to a wall construction with increased resistance to overpressure, for example to explosions, which wall construction forms part of an explosion chamber and comprises an essentially flat wall panel, adjoining structural components and at least one stop element, the wall panel and the at least one stop element being welded to the adjoining structural components, said at least one stop element having a supporting face facing the wall panel, which supporting face can be brought into interaction with the wall panel on deformation of the wall panel under the influence of an overpressure on that side thereof that faces away from the stop element.

Such a wall construction is disclosed in U.S. Pat. No. 4,632,041, in which an explosion chamber is described. This known wall construction has a flat wall panel that is welded to a cylindrical wall with a number of triangular support pieces thereon. The purpose of these support pieces is to restrict deformations of the weld joint between the cylindrical wall and the wall panel, which deformations can be the consequence of an explosion in the explosion chamber. The wall construction further comprises stop elements formed by vertical and horizontal girders having supporting faces facing the wall panel. The girders are being welded to the cylindrical wall as well as to the wall panel resulting in a very rigid construction.

The aim of the invention is to provide a wall construction that does not have these disadvantages. Said aim is achieved in that the at least one stop element is formed as a stop block which only covers an edge area of the wall panel and contacts said wall panel.

When subjected to stress by overpressure the wall construction according to the invention can undergo substantial deformation without this resulting in failure by only using some simple and relatively small stop blocks. Specifically, the wall panel can acquire a curvature such that it starts to act as a membrane. The resulting membrane stresses can be absorbed by the wall panel exceedingly well.

The stop element is located at the place where the part of the wall panel adjoins a weld. This prevents the occurrence of excessive flexural deformation at the location of the weld, which could easily lead to failure of the weld.

The supporting face of the stop element can be located some distance away from the wall panel in connection with tolerances. If necessary, this distance can subsequently be reduced by means of filler plates. The stop elements thus also have the advantage that they can be fitted to an existing wall construction at a later date.

The stress pattern in the deformed wall panel can be favourably influenced in an embodiment in which the distance of the supporting face of the stop element from the wall panel decreases towards the structural component adjoining said supporting face. In this context the supporting face of the stop element is preferably curved.

In order to leave space for the weld bead that is present between the wall panel and the adjoining structural components, the stop element can have a recess such that the supporting face terminates some distance away from the adjoining structural component.

Depending on the support required from the wall panel, multiple stop elements can be provided regular distances apart. A continuous support is also possible.

The stop elements also reduce the shear stresses in the panel and therefore also the risk of failure as a consequence of shear stresses.

An illustrative embodiment of the wall construction according to the invention will now be explained in more detail with reference to the figures.

Figure 1:
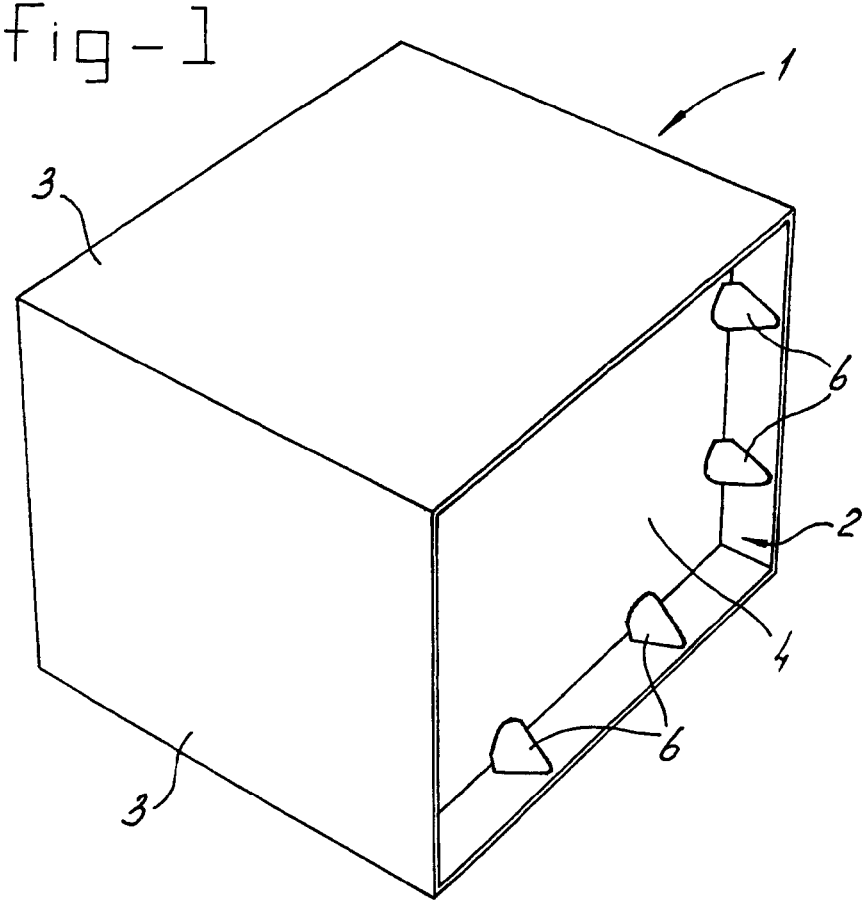
FIG. 1 shows a perspective view of the outside of an explosion chamber.

The explosion chamber 1 shown in FIG. 1 has a wall construction 2 according to the invention, that is welded all round to adjoining structural components, which are constructed as walls 3. The explosion chamber also has an access door, which is not shown, as well as other facilities that are required with such a chamber.

Figure 2:
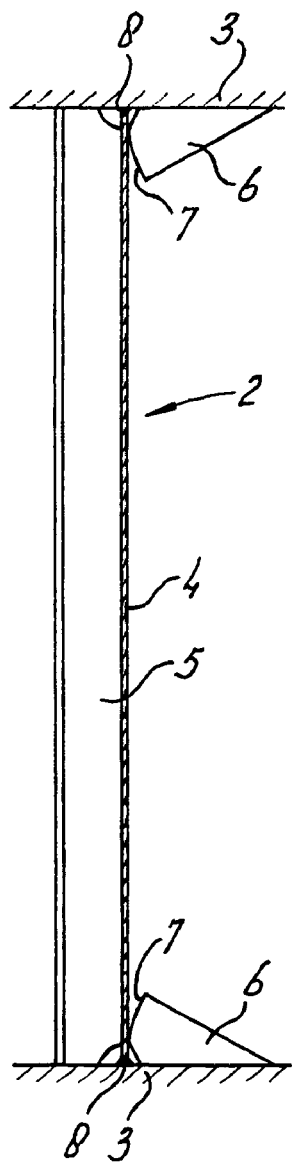
FIG. 2 shows a section through the wall construction used in the explosion chamber according to FIG. 1, in the undeformed state.

As is shown in FIG. 2, the wall construction according to the invention has a wall panel 4, to the inside of which reinforcing bars, for example T-bars 5, are welded in the customary manner.

Stop elements 6 according to the invention are fitted on the outside of the wall panel. These stop elements 6 are welded to the adjoining structural components 3 and have a curved supporting face 7.

Figure 3:
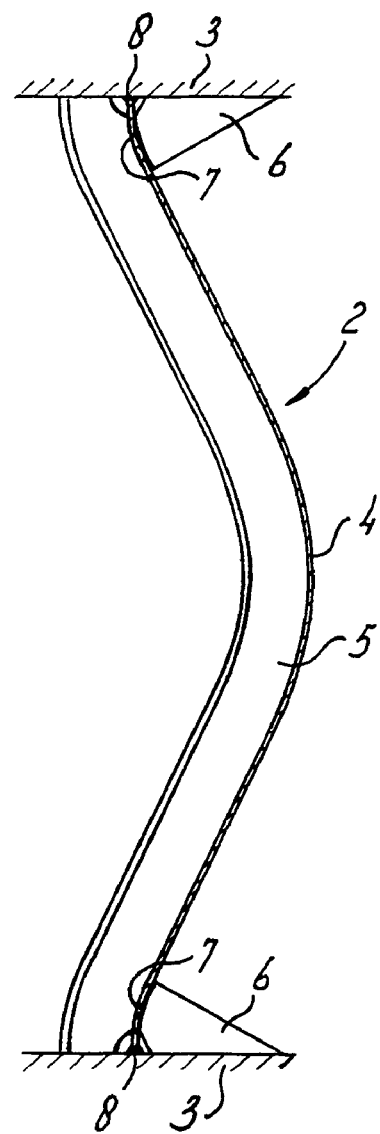
FIG. 3 shows a section through the wall construction according to the invention in the deformed state.

As soon as an explosion occurs in the explosion chamber, high pressure is exerted on the wall panel 4 causing it to deform into the state shown in FIG. 3. The reinforcing bars 5 also deform. The wall panel 4 is able to absorb substantial forces in this deformed state since it is exposed to membrane stresses in its surface. As it is known, a panel is well able to withstand such membrane stresses. In addition, the support bars 5 of course have a supporting function.

Figure 4:
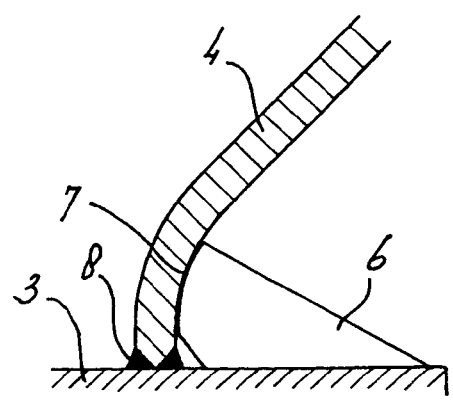
FIG. 4 shows an enlarged detail of the deformed wall construction according to FIG. 3.

As can readily be seen in the detail in FIG. 4, the wall panel 4 has come into contact with the supporting face 7 of stop element 6 during deformation. In this context the curvature of said supporting face 7 has been so chosen that the wall panel 4 has been gradually bent outwards from the weld 8. As a result excessive flexural stresses, especially in the outermost fibres of the wall panel 4, are avoided. It is also important that the weld 8 is hardly exposed to flexural stresses, as a result of which the risk of failure of the weld is largely prevented.

The advantage of the wall construction of the invention is that the stop elements 6 can easily be fitted to an exiting explosion chamber at a later date. In this context it is necessary only to weld the support elements 6 to the structural components adjoining the wall panel 4, such as the walls 3.

What is claimed is:

1. Wall construction with increased resistance to overpressure, such as overpressure as a consequence of explosions, comprising an essentially flat wall panel (4) that is welded at a peripheral edge thereof to adjoining structural components (3), characterized in that the adjoining structural components (3) are provided with at least one stop element (6) thereon positioned adjacent to an outer surface of the wall panel, the stop element (6) having a supporting face (7) facing the wall panel (4), which supporting face is positioned such that it can be brought into a supporting relationship with the outer surface of the wall panel (4) on outward deformation of the wall panel (4) under the influence of an overpressure on an inner side thereof that faces away from the stop element (6), the stop element supporting the wall panel at a position inward from the peripheral edge, so as to resist wall deflection at a weld joint between the wall panel and structural components.

2. A wall construction according to claim 1, wherein at least a portion of the supporting face (7) of the stop element (6) is spaced away from the wall panel (4).

3. Wall construction according to claim 1, wherein the distance of the supporting face (7) of the stop element (6) from the as yet undeformed wall panel (4) decreases towards the structural component adjoining said supporting face (7).

4. Wall construction according to claim 1, wherein the stop element (6) has a recess such that the supporting face (7) is spaced away from the adjoining structural component (3) adjacent the weld between the wall panel (4) and the structural components (3).

5. Wall construction according to claim 1, wherein multiple stop elements are provided regular distances apart.

6. An explosion resistant wall construction comprising:

An outwardly deformable wall panel attached to surrounding structural components by a weld joint formed between the wall panel and structural components at an outer peripheral edges of the wall panel; and One or more stop elements positioned on the structural components adjacent an outer surface of the wall panel, the stop elements having a supporting face facing the outer surface of the wall panel, the supporting face being positioned to engage the wall panel outer surface as the wall panel deforms outwardly as a result of an overpressure force on the opposite side of the wall panel, the supporting face being shaped and positioned to resist outward deformation of the wall panel at the peripheral edge of the wall panel, so as to minimize stress on the weld joint.

7. An explosion resistant wall construction as in claim 6 wherein the supporting face is closer to the wall panel at an outer portion of the supporting face adjacent the structural component than it is at an inner portion of the supporting surface.

8. An explosion resistant wall construction as in claim 7 wherein the supporting face has a curved surface extending between the outer and inner portion thereof.

9. An explosion resistant wall construction as in claim 6 wherein the supporting face on the stop element has a recessed outer edge which provides clearance for the weld joint, such that the supporting face can engage the wall panel on outer expansion thereof without engaging the weld joint.

10. An explosion resistant wall construction as in claim 7 wherein a plurality of stop elements are spaced around the periphery of the wall panel.

11. An explosion resistant wall construction as in claim 6 wherein the supporting face on the stop element has a generally triangular profile, with a wider base of the triangle being positioned adjacent the outer periphery of the wall panel.

12. An explosion resistant wall construction as in claim 6 wherein the wall construction further comprises an outwardly deformable reinforcing bar positioned adjacent an inner surface of the wall panel.

13. In an explosion chamber wherein a generally flat, outwardly deformable wall panel is attached to adjoining structural components by a weld joint formed between the structural components and a peripheral edge of the wall panel, the improvement wherein a plurality of spaced stop elements are positioned on the structural components adjacent an outer surface of the deformable wall panel at the peripheral edge thereof, the stop elements having supporting faces that face the outer surface of the wall panel adjacent the edge, the stop elements being positioned to engage the wall panel at a position inward of the peripheral edge thereof when the wall panel is deformed outwardly as a result of overpressure, such that the stop elements resist flexural stresses at the weld joint and thereby resist the breaking of the weld joint.

14. An explosion chamber as in claim 13 wherein the supporting faces of the stop elements are formed so as to curve away from the outer surface of the wall panel as the stop element extends inwardly from the structural components toward the interior of the wall panel.

* * * * *